United States Patent

Shiau

[11] Patent Number: 5,904,591
[45] Date of Patent: May 18, 1999

[54] POWER CONNECTOR SYSTEM FOR USE WITH A COMPUTER SYSTEM SYNCHRONOUSLY

[76] Inventor: Julian J. L. Shiau, 2F, No. 7-1, Lane 149, Lung-Chiang Rd., Taipei, Taiwan

[21] Appl. No.: 08/835,754

[22] Filed: Apr. 8, 1997

[51] Int. Cl.[6] .................................. H02H 1/04; H02J 3/00
[52] U.S. Cl. .......................... 439/502; 439/652; 307/38
[58] Field of Search ................................ 439/502, 652; 361/119, 160; 307/38

[56] References Cited

U.S. PATENT DOCUMENTS

| | | | |
|---|---|---|---|
| 4,867,701 | 9/1989 | Wiand | 439/502 |
| 5,579,201 | 11/1996 | Karageozian | 361/119 |
| 5,731,947 | 3/1998 | Hirose | 307/38 |

Primary Examiner—Gary Paumen
Attorney, Agent, or Firm—Rosenberg, Klein & Bilker

[57] ABSTRACT

A power connector system including a first power socket connected to a power supply unit of a host computer, a control element, a plurality of second power sockets controlled by the control element to obtain power supply from the power supply unit of the host computer through the first power socket and adapted for providing power supply to peripheral equipment (such as speaker, modam, printer, scanner, etc.) connected thereto, and at least one third power socket connect to city power supply and adapted for providing power supply to a monitor, etc. separately.

3 Claims, 3 Drawing Sheets

POWER CONNECTOR SYSTEM FOR USE WITH A COMPUTER SYSTEM SYNCHRONOUSLY

BACKGROUND OF THE INVENTION

The present invention relates to a power connector system which receives power supply from a power supply unit of a computer system and provides it to peripheral equipment (such as speaker, modem, printer, scanner, etc.), permitting them to be synchronously turned on/off with the computer system.

The power supply unit of a computer system provides only one power outlet for the connection of a monitor. When several peripheral equipment are connected to a computer system, an extension line must be used to provide peripheral equipment with power supply. However, because the extension line is not connected in series to the power outlet of the power supply unit of the computer system, the installed peripheral equipment must be turned off separately when the computer system is turned off. If the computer user forgets to turn off the peripheral equipment, the peripheral equipment keeps consuming power supply.

SUMMARY OF THE INVENTION

The present invention has been accomplished to provide a power connector system which eliminates the aforesaid problem. It is one object of the present invention to provide a power connector system which receives power supply from a power supply unit of a computer system and provides it to the peripheral equipment being connected to the computer system, so that the peripheral equipment are synchronously turned off when the computer system is turned off. It is another object of the present invention to provide a power connector system which further comprises at least one independent power socket that is separately connected to city power supply for providing power supply to a monitor or the like.

DETAILED DESCRIPTION OF THE PREFERRED EMBODIMENT

Figure 1:
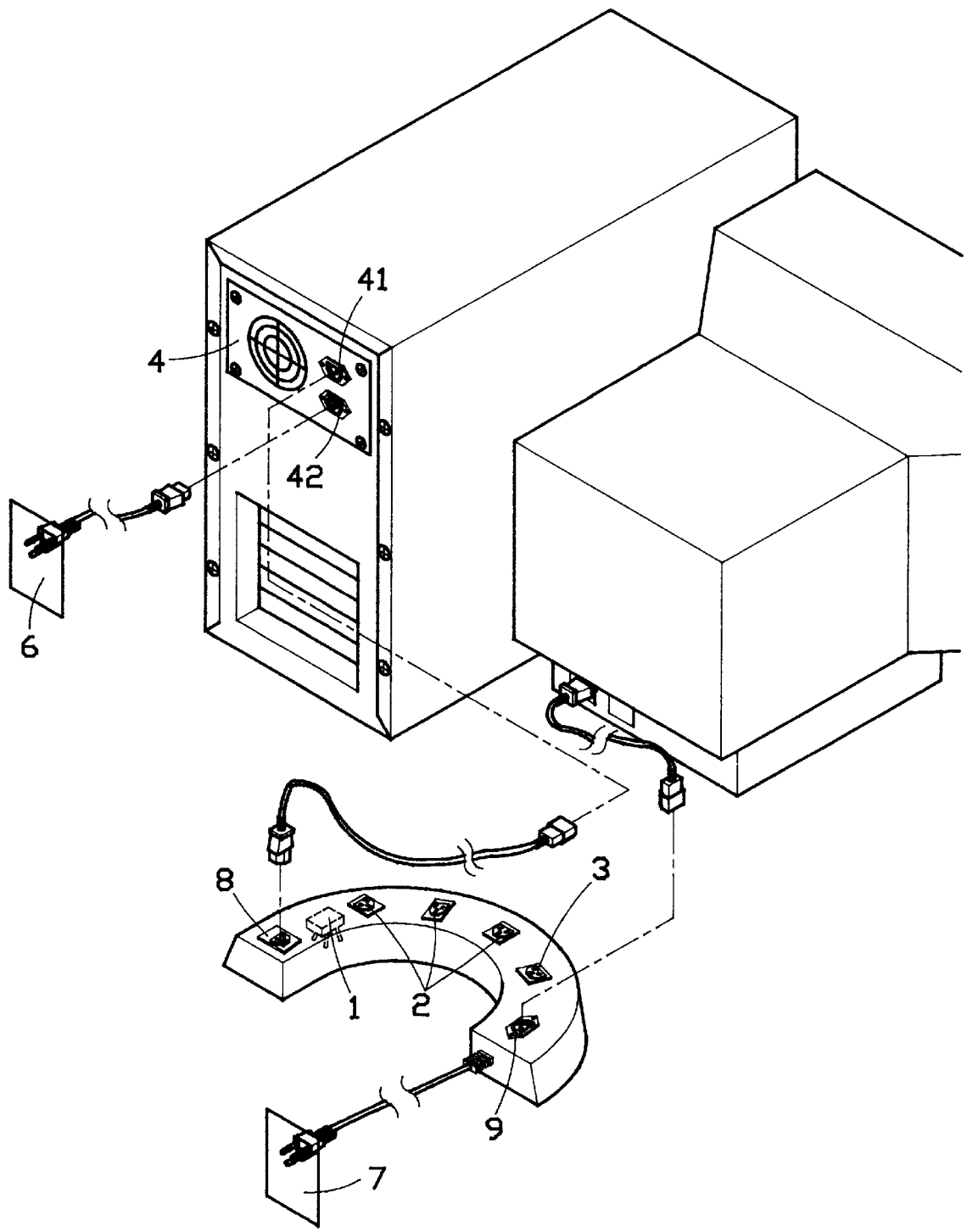
FIG. 1 shows the arrangement of a power connector system according to the present invention.

Referring to FIG. 1, the present invention comprises a relay (control element) 1, a first power socket 8, a plurality for example three second power sockets 2, a third power socket 3, and a fourth power socket 9.

Figure 2:
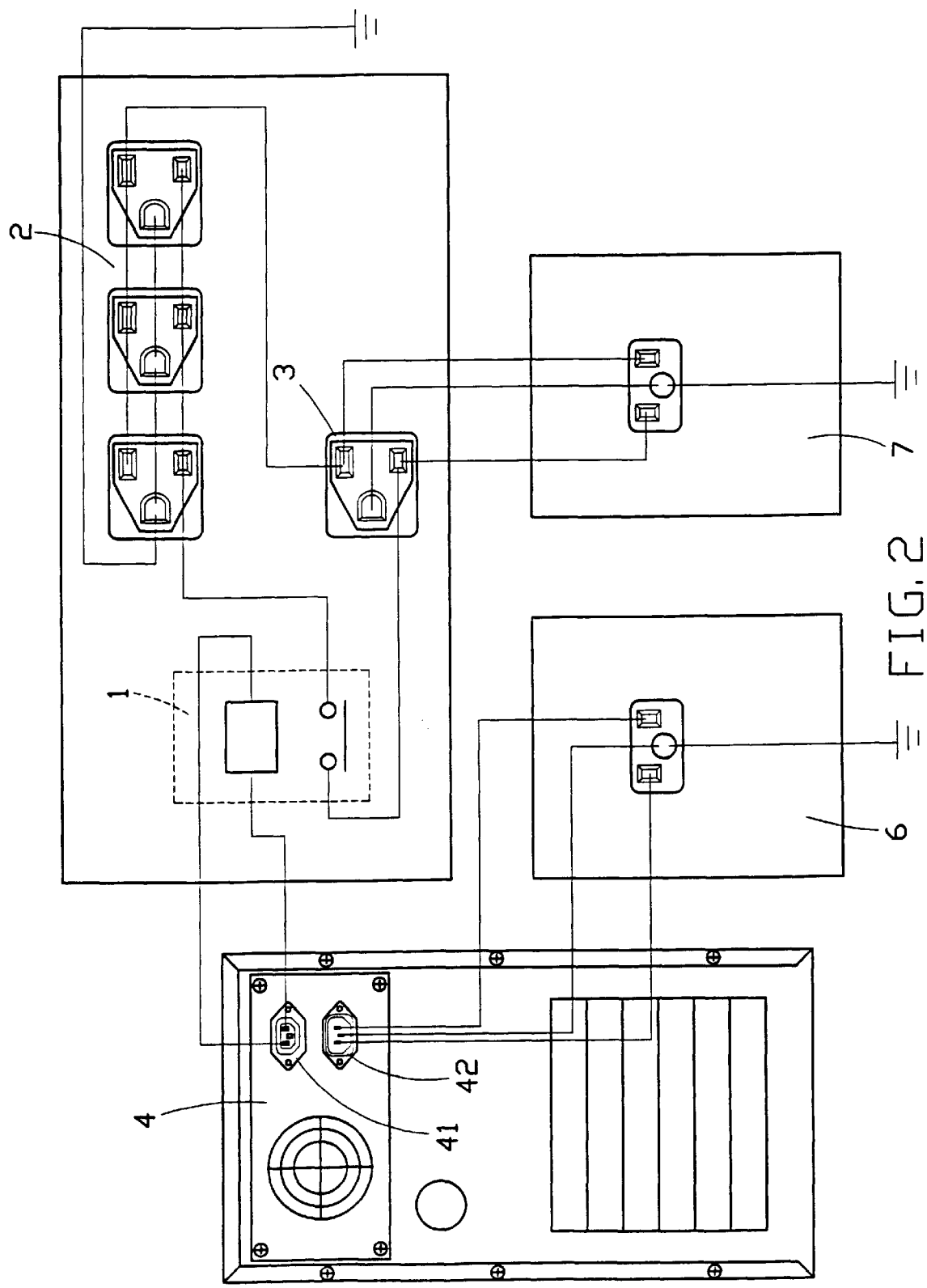
FIG. 2 is a circuit block diagram according to the present invention.
Figure 3:
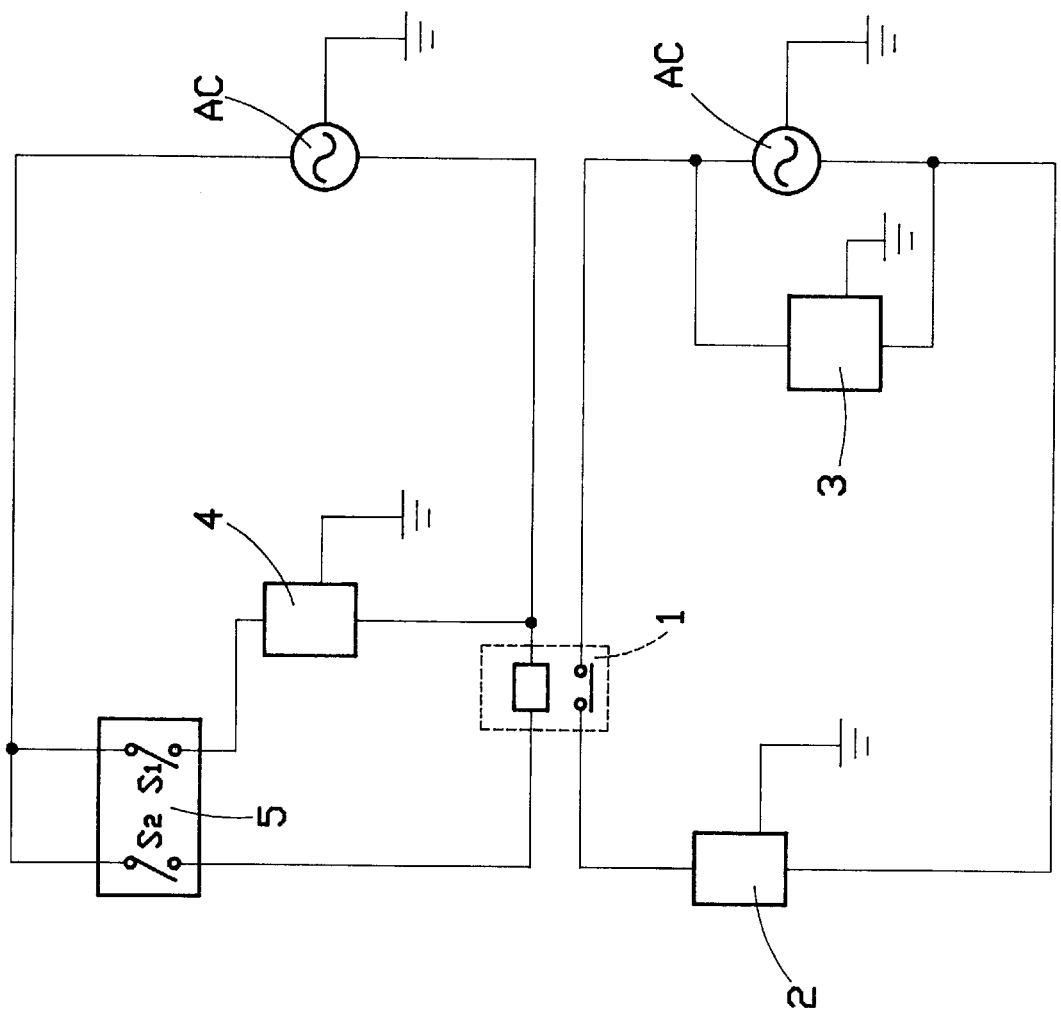
FIG. 3 is a circuit diagram of the present invention.

Referring to FIGS. 2 and 3, and FIG. 1 again, the first power socket 8 is connected to a power outlet for monitor 41 of a power supply unit 4 of a host computer. The power supply unit 4 has a power input connector 42 connected to a first wall outlet 6 to receive city power supply. The power input connector 42 is connected to a power switch 5. The power switch 5 has two contacts, namely the first contact S1 connected to the first wall outlet 6 to provide AC power supply to the power supply unit 4, and the second contact S2 which has a normal open end connected to the relay 1.

The relay 1 has a primary terminal connected to the power outlet for monitor 41 of the power supply unit 4, and a secondary terminal which has a first end connected to the second power sockets 2 and a second end connected to one end of the third power socket 3. The third power socket 3 is connected in series to a second wall outlet 7. The fourth power socket 9 is connected to the second power sockets 2, and adapted for providing power supply to for example a monitor.

The second power sockets 2 are adapted for providing power supply to peripheral equipment (such as speaker, modem, printer, scanner, etc.), having one end connected to the secondary terminal of the relay 1 and an opposite end connected to the first end of the third power socket 3.

When the power switch 5 of the power supply unit 4 is switched on (off), the relay 1 is off, at the same time the second power sockets 2 are off, therefore the host computer and the peripheral equipment (such as speaker, printer, scanner, etc.) are off.

As indicated above, the present invention provides a power connector system which enables computer peripheral equipment to be synchronously turned on/off with the host computer.

It is to be understood that the drawings are designed for purposes of illustration only, and are not intended as a definition of the limits and scope of the invention.

What the invention claimed is:

1. A power connector system for connection to a monitor outlet of a computer power supply, the computer power supply being coupled to a first power outlet and the monitor outlet having an output voltage switched on and off in correspondence with on and off states of the computer power supply, said power connector system comprising an input power conductor connected to a second power outlet for receiving power therefrom;

a first power socket electrically coupled to the monitor outlet of the computer power supply for input of the switched output voltage therefrom;

a control element having (a) a first input coupled to said first power socket for input of said switched output voltages (b) a second input coupled to said input power conductor, and (c) an output, said control element coupling said received power from said second input to said output responsive to said switched output voltage from said first input representing the on state of the computer power supply and interrupting said coupling to said output responsive to said switched output voltage from said first input representing the off state of the computer power supply;

a plurality of second power sockets coupled to said output of said control element for distributing said received power provided by said control element to a plurality of peripheral devices when the computer power supply is in the on state and interrupting said distribution of received power when the computer power supply is in the off state; and, a third power socket coupled to said input power conductor for distribution of said received power when the computer is in either of the on and off states.

2. The power connector system as recited in claim 1 where said control element is a relay.

3. The power connector system as recited in claim 1 where one of said plurality of second power sockets is a monitor outlet.

\* \* \* \* \*